(12) United States Patent
Tedman et al.

(10) Patent No.: US 7,884,275 B2
(45) Date of Patent: Feb. 8, 2011

(54) MUSIC CREATOR FOR A CLIENT-SERVER ENVIRONMENT

(75) Inventors: Adam Tedman, Jersey City, NJ (US); Gerard Luna, New York, NY (US)

(73) Assignee: Take-Two Interactive Software, Inc., New York, NY (US)

( * ) Notice: Subject to any disclaimer, the term of this patent is extended or adjusted under 35 U.S.C. 154(b) by 1035 days.

(21) Appl. No.: 11/335,817

(22) Filed: Jan. 20, 2006

(65) Prior Publication Data

US 2007/0174430 A1     Jul. 26, 2007

(51) Int. Cl.
*G04B 13/00* (2006.01)

(52) U.S. Cl. .............................. 84/612; 84/609; 84/615; 84/649; 84/652; 84/653

(58) Field of Classification Search ........................ None
See application file for complete search history.

(56) References Cited

U.S. PATENT DOCUMENTS

| | | | | |
|---|---|---|---|---|
| 5,734,119 | A * | 3/1998 | France et al. .................. | 84/622 |
| 6,552,254 | B2 * | 4/2003 | Hasegawa et al. ............. | 84/609 |
| 6,570,080 | B1 * | 5/2003 | Hasegawa et al. ............. | 84/609 |
| 2002/0026867 | A1 * | 3/2002 | Hasegawa et al. ............. | 84/609 |

* cited by examiner

*Primary Examiner*—Marlon T Fletcher
(74) *Attorney, Agent, or Firm*—Kenyon & Kenyon LLP

(57) ABSTRACT

A system and method are provided wherein a server based music creator is accessible by a client for the creation of composite audio files. The method and system receives, from a remote client computer via a network connection, a play sequence for playing audio segments, wherein a play sequence identifies one or more audio segments and associates at least one temporal location in a playback timeline with each audio segment. A composite audio file including each audio segment identified in the play sequence is generated, such that the composite audio file when played plays each audio segment identified by the play sequence at each audio segment's associated temporal location(s). The composite audio file is then transmitted to the client computer. In another non-limiting example, the play sequence includes one or more track sequences. In a further non-limiting example, a server computer coupled to a communications network transmits to the client computer, computer-executable instructions for generating and displaying a graphical user interlace. The graphical user interface allows a user to select audio segments accessible to the server computer but not directly available to the remote client computer from the server computer, to arrange the audio segments into a play sequence by identifying temporal locations within the play sequence at which the audio segments should be played, and to transmit the play sequence to the server computer.

36 Claims, 4 Drawing Sheets

MUSIC CREATOR FOR A CLIENT-SERVER ENVIRONMENT

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

Various embodiments of the present invention relate to software for the creation of audio files. In one example (which example is intended to be illustrative and not restrictive), the systems and methods of the present invention may be applied providing music creation software on a server that is accessible from a client computer using a browser.

BACKGROUND OF THE INVENTION

The creation of new digital music through the combination of samples of prerecorded music and sounds has become popular. Such creation has been facilitated by computer software designed specifically for the task and access, via the Internet, to vast amounts of prerecorded songs, sounds, effects, and speech. Music creation software on a computer may allow a user to select prerecorded audio files, assemble them in some order, and then save the resulting creation as a new audio file for future playback or distribution.

Typically, digital music creation has been hampered by the need for a computer system with extensive memory and processing capabilities. Extensive memory is typically required because digital music is very data intensive. For example, one common audio format for recording audio is the .WAV format used on compact discs (CDs). In order to effectively recreate analog sounds to the human ear, CDs store audio data as a sequence of 16-bit (i.e. 2-byte) "samples," using 44,100 samples to reproduce one second of audio playback. Thus, approximately 88 kilobytes (KB) of data is required for each second of audio in this format. If two channels are used, as is common in modern stereo systems for playing music, then approximately 176 KB of audio data is required per second.

In order to manipulate the audio files that are used to create new music, music creation software often must load each constituent audio file into memory, requiring substantial available memory from the host computer. Furthermore, editing music during the creation process (e.g., cutting and pasting portions of audio and supporting undo operations) requires even more memory. If the memory is unavailable, the user may perceive the software as operating unacceptably slowly as audio data is transferred between memory, storage and back during processing. Thus, most music creation software is provided with minimum memory requirements that are extremely high in comparison to normal computing needs, which increases the cost of the computer to a digital music creator.

Furthermore, editing such large amounts of data requires a large and fast processor or the editing process will again be perceived as unacceptably slow. Such a processor represents an additional expense to the digital music creator.

SUMMARY OF THE INVENTION

Various embodiments of the present invention relate to a client-server system for creating composite digital audio files from one or more audio segments.

In one example (which example is intended to be illustrative and not restrictive), the systems and methods of the present invention may be applied by providing a computer-readable medium encoding computer-executable instructions for performing a method for creating a composite audio file. The method includes receiving, from a remote client computer via a network connection, a play sequence for playing audio segments. Such a play sequence identifies one or more audio segments and associates at least one temporal location in a playback timeline with each audio segment. The method further includes generating based on the play sequence, and in response to a request from the client computer, a composite audio file including each audio segment identified in the play sequence, such that the composite audio file when played plays each audio segment identified by the play sequence at each audio segment's associated temporal location(s). The composite audio file is then transmitted to the client computer via the network connection.

In another non-limiting example, the systems and methods of the present invention may be applied by providing a computer-readable medium encoding computer-executable instructions for performing a method for creating a composite audio file, the method comprising receiving, from a remote client computer via a network connection, a play sequence for playing audio segments. The play sequence includes one or more track sequences, each track sequence identifying one audio segment and at least one temporal location within a playback timeline. A composite audio file is generated based on the play sequence and in response to a request from the remote client computer. The composite audio file includes audio segments identified in the play sequence. The file, when played plays each audio segment identified by the one or more track sequences in the play sequence at each audio segment's associated temporal location(s) within the playback timeline. The composite audio file is transmitted to the client computer via the network connection.

In a further non-limiting example, the systems and methods of the invention may be applied by providing a system for creating composite audio files. The system includes a server computer coupled to a communications network and operable to communicate via the communications network with a remote client computer coupled to the communications network. The server transmits to the client computer, responsive to receiving a first client request from the client computer via the communications network, computer-executable instructions for generating and displaying a graphical user interface. The graphical user interface allows a user to select audio segments accessible to the server computer but not directly available to the remote client computer from the server computer, to arrange the audio segments into a play sequence by identifying temporal locations within the play sequence at which the audio segments should be played, and to transmit the play sequence to the server computer.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of at least one embodiment of the invention.

In the drawings.

DETAILED DESCRIPTION OF EMBODIMENTS OF THE INVENTION

Reference will now be made in detail to illustrative embodiments of the present invention, examples of which are shown in the accompanying drawings. In general, embodiments of the present invention include a server application that generates composite audio files from directions received from a client computer. The client computer provides a user interface to the user for the server application and a means for receiving and rendering audio files from the server application. The storage, processing and manipulation of the audio data may be performed at the server computer using the server computer's hardware resources such that a completed composite audio file is transmitted to the client computer for rendering to the user. Thus, the client computer need only have the hardware resources necessary to provide the user interface and to receive and render audio files. In addition, the server maintains control over the audio data and files thereby enhancing the security of the music creation process and data files involved.

Figure 1:
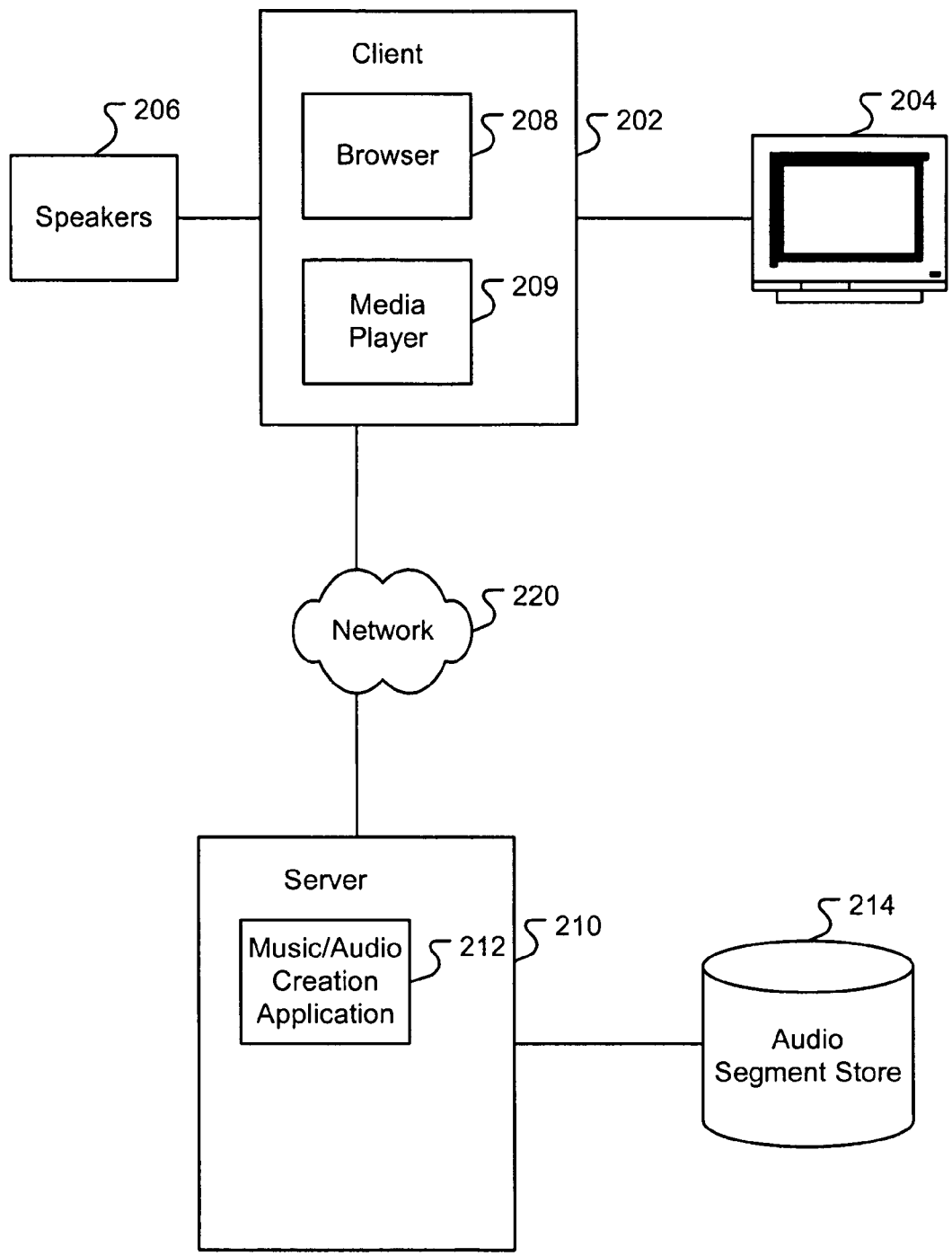
FIG. 1 is a high-level illustration of a client-server computing environment in accordance with an embodiment of the present invention.

FIG. 1 is high-level illustration of an embodiment of the present invention showing a client computer 202 (alternately referred to simply as the client 202) connected to a server computer 210 (alternately referred to simply as the server 210) via a network 220. The client computer 202 includes a display 204 and speakers 206 for rendering visual and audio content to a user, respectively. The server computer 210 is provided with a music creation application 212 and is further connected to a data store 214 containing audio segments. The data store 214 may be local to the server computer 210 or remote as shown.

In one embodiment, the client computer 202 is a typical personal computer connected to the server computer 210 via the communications network 220, which may be a wide area network such as the Internet or a local area network. The client computer 202 is provided with communication software 208, commonly referred to as a "browser" 208. Examples of browsers include, e.g., Internet Explorer available from Microsoft Corporation of Redmond, Wash., Netscape Navigator available from Netscape Communications of Mountain View, Calif., and Firefox available from Mozilla Corporation of Mountain View, Calif. Depending on the particular browser 208 which is used, a media program 209 (sometimes referred to as a plug-in or a media player) that works with the browser 208 to render audio and video content to the display 204 and the speakers 206 may also be used. One example of such a media program 209 is that marketed under the tradename Flash, which is available from Macromedia, Inc. of San Francisco, Calif.

The server computer 210 includes a music creation application 212. The music creation application receives play sequence information from the client computer 202. Based on the play sequence information, the music creation application 212 generates a composite audio file or set of files from audio segments contained in the data store 214 and, if necessary, audio segments provided by the client with the transmitted information. The contents of the play sequence information and the process of creating a composite audio performed by the music creation application are discussed in greater detail with reference to FIG. 3 below.

In one embodiment, the browser 208 communicates with the server 210 via the Internet 220 using standard communication protocols such HTTP, XML, and FTP. Embodiments of the present invention will be generally discussed in terms of communications using the HTTP protocol with the understanding that the methods may be adapted by one skilled in the art for use with any standard communication protocol. Under the HTTP protocol, the client computer 202 initiates communication with the server computer 210 by sending an HTTP request from the browser 208 to the server computer 210. The HTTP request identifies the server by its domain name, e.g., "http://beaterator.rockstargames.com", and identifies a specific resource on the server 210 such as "/beaterator.html." Such a resource may correspond to a static file such as an .html file, or a programmatic resource such as an active server page (e.g., an ASP+ or ASP.NET program). In response to this request, the server 210 transmits information to the browser 208 on the client computer 202. This information includes instructions to the browser 208 for generating a graphical user interface. Such instructions may take the form of a "page" of code written in a markup language such as .html, a java applet or a file executable by the browser 208. Upon receipt of the instructions, the browser then renders the graphical user interface on the display 204.

An embodiment of the present invention includes a method of creating a type of audio file called a "loop." A loop is an audio segment (i.e., an amount of audio data that can be rendered to create sound), often in the form of a discrete file, that is designed to create a continuous beat or pattern of notes, sounds, or samples when played repeatedly. Loops are defined to have a length that corresponds to some fixed number of bars, usually one to four bars in length, irrespective of the tempo selected. Tempo refers to the time allocated to a specified measure of music and is usually represented a number of beats per minute (BPM). Loops are created as a composite of individual sounds of fixed length and must be regenerated or recompiled from their constituent sounds if the tempo is changed.

In an embodiment of the present invention, loops are created by taking sounds of fixed length and placing those sounds on a timeline in a user-selected order to be played. To facilitate the creation, a loop creation tool called a "loop crafter" is provided. The loop crafter displays a loop timeline having a fixed length, typically measured in bars, phrases or beats, which is then subdivided into equal sections. For example, a loop may be defined as 4 bars in length, each bar having 16 sections. To create a loop, a user selects an individual sound and assigns it to any of sections of the timeline as desired to create an order in which the sounds are to be played. Sections which do not have assigned sounds are silent. From the user-created order and a provided tempo, a loop file may then be created. In one embodiment, each individual sound is assigned to a "track" having its own timeline. Complicated loops can then be created from multiple tracks, each having different sounds playing at different or simultaneous points in the timeline. In addition, a pre-existing loop may be assigned to a track of the loop crafter, thereby allowing additional tracks to be added to pre-existing loops.

In another embodiment of the present invention, audio files such as songs can be created from loops and sounds using a main mixer/sequencer tool. The main mixer/sequencer provides to the user a set of tracks, each track having a song timeline of some length. The length of a song timeline is often measured in phrases or larger units that often correspond to one loop. A user selects loops or sounds as desired and assigns each to a different track. Then, the user selects when on the displayed song timeline the assigned loop or sound should be played. The information in the timelines, along with a user-selected tempo, may then be used to create an audio file of the song created by the user with the main mixer/sequencer tool.

Figure 2:
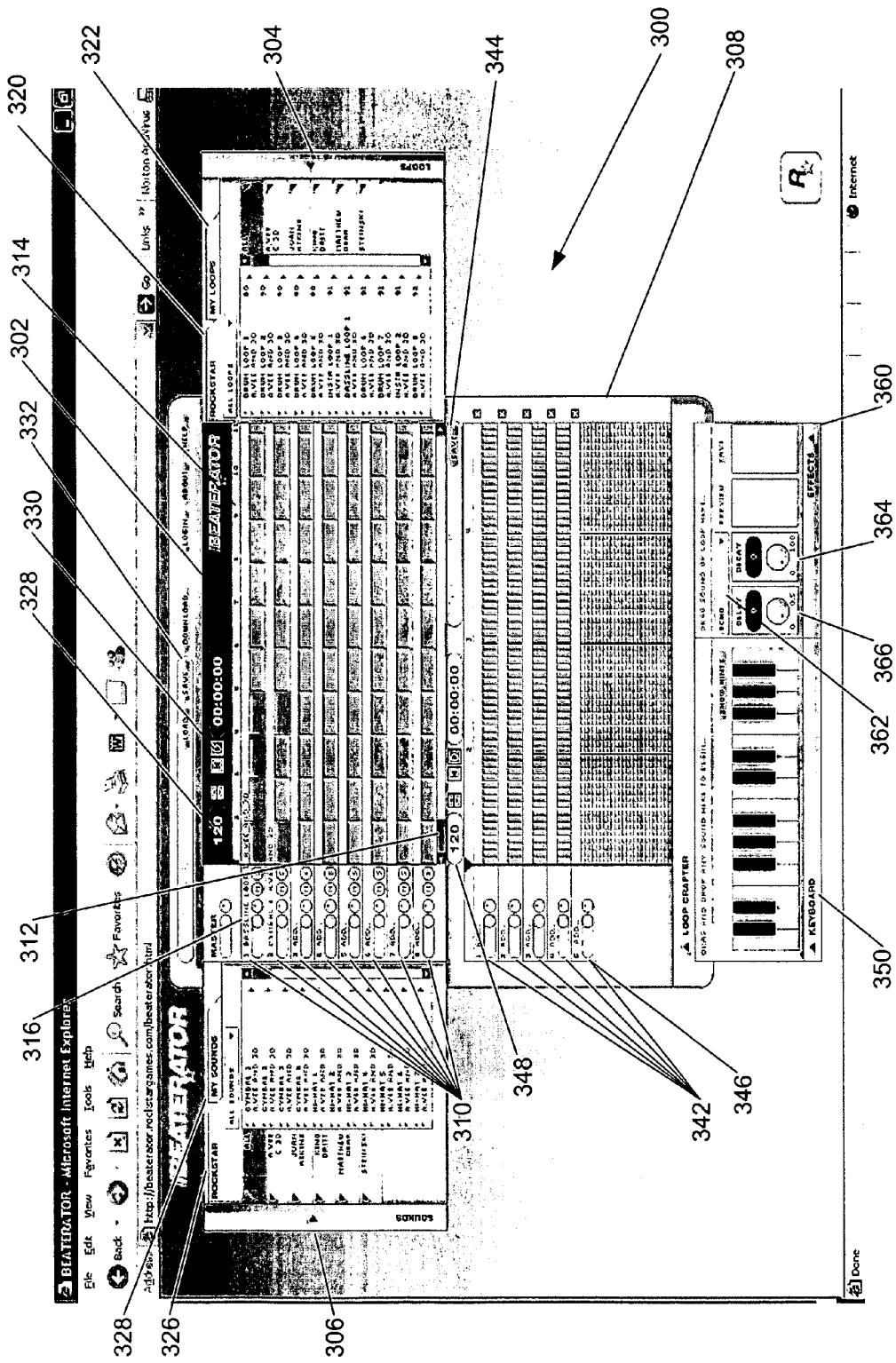
FIG. 2 is an illustration of a graphical user interface rendered on a client display according to an embodiment of the present invention.

FIG. 2 is an illustration, in the form of a screenshot of a browser window rendered on a display 204 to a user, of an embodiment of a graphical user interface (GUI) associated with a server-based music creation application according to an embodiment of the present invention. The following is a brief discussion of some of the controls and user interface elements provided by the GUI 300. A more complete discussion of the GUI 300 in accordance with one embodiment can be found in the help manual provided in Appendix.

The GUI 300 allows a user of the client computer 202 to interact with the server computer 210 and specifically with the music creation application 212 on the server 210. In response to one or more user inputs on the GUI 300, the browser 208 sends a play sequence request in the form of an HTTP request to the server 210. The content of the request is determined by the selections made by the user's interaction with the GUI 300.

In the example shown, the GUI 300 includes a main mixer/sequencer section 302, a loop selection section 304, a sound selection section 306, and a loop crafter section 308. The sound selection section 304 includes two tabbed pages 324 and 326 containing lists of audio segments known as sounds. A first tabbed page 324 is provided showing a first list of sounds stored on or otherwise accessible to the server computer 210 and the music creation application 212. A second tabbed page 326, titled "My Sounds," includes a second list that contains custom sounds created by the user that may be stored locally on the client computer 202 or on the server 210 in association with the user's account.

A sound is an audio segment, often in the form of a discrete file, that typically does not include a loop and has a fixed length in time. Examples of sounds are cymbal crashes, shouts, beeps, spoken phrases and sound bites. Sounds may be rendered in more or less time than their fixed length in one of two ways. First, the sampling rate of the sound may be adjusted to force the sound to render in the selected render time. This will cause the pitch of the sound to change and be perceived differently by a listener. Second, the sound may be truncated or cut off at the end of the selected render time (if the render time is less than the sound's length) or silence may be introduced after the sound has finished (if the render time is greater than the sound's length). This has no effect on the sound's pitch or its perception by a listener.

The loop selection section 304 similarly includes two tabbed pages 320, 322 containing lists of audio segments known as loops. One 320 of the two tabbed pages, titled "Rockstar," includes a first list showing loops stored on or otherwise accessible to the server computer 210 and the music creation application 212. The other tabbed page 322 includes a second list (although not visible in FIG. 2), titled "My Loops," that when selected shows a list of custom loops created by the user that may be stored locally on the client computer 202 or on the server 210 in association with the user's account.

The main mixer/sequencer section 302 displays a song timeline 314 of a little more than 10 phrases (i.e., four-bar groups) along the x-axis for each of eight numbered tracks 310 on the y-axis. Different phrases may be viewed by scrolling scrollable slider 312 at the bottom of the mixer section 302 so that the song timeline 314 is not limited by the size of the display window of the GUI 300. Depending on the embodiment, the length of the timeline may be fixed or may be user-selectable within some minimum or maximum range. In one embodiment, a track 310 is defined as sixty phrases in length (the additional phrases being viewable via manipulation of the slider 312). A user is able to independently select and deselect whole tracks 310, or individual phrases or groups of phrases within a track 310 using a pointing device such as a mouse. Each track 310 is provided with its own individual volume control and pan (balance) control, as well as Mute and Solo buttons in a control subsection 316 within the main mixer/sequencer section 302.

Through the user's pointing device, a user may select a loop or sound from the appropriate selection sections and drag-and-drop the selected audio segment on a track 310. This assigns the audio segment to that particular track. For example, as shown in FIG. 2 Track 1 is assigned to the audio segment titled "BASSLINE LOOP 1" and Track 2 is assigned to the audio segment titled "CYMBAL 4." Tracks 3-8 are unassigned.

After assigning audio segments to one or more tracks 310, the user can dictate when the audio segments will be played relative to the displayed timeline 314 by clicking on selected phrases within the tracks 310. For example, in FIG. 2, the user selected the first four phrases of Track 1 (as shown by the highlighted phrases) and the first phrase and fourth phrase of Track 2. Upon pressing the play button 330, as discussed in greater detail below, the client 202 will create and send a play sequence to the server 210.

In one embodiment, the play sequence contains the necessary information entered by the user via the GUI for the server to generate the corresponding composite audio file that is the audio equivalent of the visual representation displayed on the GUI 300. The server then creates and returns a composite audio file which, when rendered by the browser, will consist of the audio starting with the sound CYMBAL 4 being played at the same time the loop BASSLINE LOOP 1 begins. The audio will continue by repeating the loop BASSLINE LOOP 1 three more time and, at the start of the last time, the sound CYMBAL 4 will be replayed. Thus, through this GUI 300, a user may create a composite audio file from audio segments, using up to eight tracks of audio loops and sounds. Created composite audio files may then be saved using a save button 332.

In an alternative embodiment, upon clicking the play control 330 the play sequence transmitted contains the necessary information for the server application 212 to generate and transmit each audio segment currently assigned to a track 310. In this embodiment the play sequence may identify the audio segment and the tempo, but may not include the temporal location information. The server responds, as discussed below, by generating and transmitting the up to eight individual audio segments in the form of separate audio segment files. The rendering and temporal arranging of the various audio segments is then controlled by the browser 208 and/or the media program 209. While this alternative embodiment requires more memory and processing capabilities than returning a single composite audio file, it allows the user to change the temporal arrangement without the need for regenerating the various audio segments. However, any user change in tempo or selection of different audio segments will require regeneration of the audio segments by the server application 212. In this alternative embodiment, the composite audio file may be generated at the client upon receipt of a save command from the user via the save control 332 or may be generated by the server application 212 as discussed above. This alternative embodiment is suitable for use with the Flash Player by Macromedia, as that media program can simultaneously render up to eight audio files.

The GUI 300 also contains a loop crafter section 308. The loop crafter section 308 allows a user to similarly create custom loops. The loop crafter section 308 displays a timeline 340 of one phrase divided into four bars (x-axis) for five numbered loop tracks 342. Each bar is divided into 16 sections. In a way similar to the main mixer/sequencer 302, a user may assign sounds or loops to the loop tracks 342 and select different sections within the bar to play the assigned audio segment. The loop crafter section 308 is further provided with a save button 344 to save such custom-made loops. The saved loops will then appear in the "My Loops" page 322 of the loop selection section 304.

In the embodiment shown, the loop crafter section 308 creates loops which have a length of one phrase. Thus, the time necessary to render the loop will be dictated by the tempo that the loop is played back at. When using sounds to create loops with the loop crafter 308 or longer audio files with the main mixer/sequencer 302, the fixed duration of sounds requires that they be handled specially when generating the final composite audio file for the loop.

In one embodiment, the loop crafter 308 truncates a sound assigned to a track if that sound has not completely played by the time it is to be played again. This requires the server, when generating the composite audio to use only the portion of the sound that is played depending on the play sequence and the tempo selected by the user.

In an alternative embodiment, the loop crafter 308 does not truncate but sums the remaining portion of the prior sound with the each subsequent occurrence of the sound that overlaps. In either case, the audio rendering of the sound is the same regardless of the tempo, thus changes in tempo do not alter the pitch of the sound to a listener.

In yet another embodiment, the loop crafter 308 distinguishes between the first bar and the remaining three bars in the loop timeline. Sounds that begin in the first bar and extend into the later bars are not truncated and are allowed to play to completion. However, sounds in the later bars are truncated either at the end of the loop, at the end of their bar or upon occurrence of the next instance of the sound. This treats the first bar, in effect, as an introductory bar with different rules on truncation than are applied to the remaining bars of the loop. It further preserves the resulting loop's as one phrase by truncating any extension beyond the fourth bar.

One particular situation occurs when crafting loops that merits additional discussion. When creating loops using the loop crafter section 308, it is possible to select and arrange sounds in the loop tracks 342 and select a tempo in such a way that some sections of the loop timeline are silent, i.e., when the selected audio segments on the timeline are rendered there is at least some time that no audio will be played and that portion of the loop is silent. The silences occur naturally during loop creation as the loop crafter has determined, based on the timeline information, not to render any sound at that time.

However, subsequently creating a composite audio file for the same loop that has the same silences requires that the server application 212 generate audio data. This is because, as discussed briefly above, audio files are composed of a series of samples with each sample being a digital representation of the sound that should be played at a specific time in the playback. When the server application then creates the composite audio file, at locations in the composite audio file that correspond to a silent location audio data are inserted that result in silence when the composite audio file is subsequently rendered. Note that this may include adding audio data for silence at the beginning or the end of an audio file.

In one embodiment, a loop or song containing one or more silent sections is created by determining the lengths and locations of any silent sections based on the tempo and the location of the other audio segments in the play sequence. This is done by iteratively inspecting the play sequence and comparing the output generated by each track at each sample point. At sample points that should have audio from a single track, that track's audio data is used to create the appropriate audio data for the sample. At sample points that correspond to a point in the timeline in which multiple tracks are playing audio at the same time, the server application sums the audio data from the different tracks to create composite audio data for the sample. At every sample point that is identified to have no audio playback from any of the tracks, audio data corresponding to no sound (i.e., an empty waveform) is inserted. In another embodiment, a starting file of the appropriate length is created that contains only audio data for silence (i.e., every sample point in the file contains only audio data for silence). Each track is then iteratively summed with the starting file. Thus, audio data corresponding to silence will remain in the correct locations where it has not been overwritten by the summing with a sound on a track.

The GUI 300 also allows the user to control the tempo of the composite audio via a tempo control 328 for the main mixer/sequencer section 302 that applies to all eight tracks in the main mixer/sequencer section 302 and a separate tempo control 348 for the loop crafter section 308 that applies to its five tracks. The controls include a current tempo display in BPM and include an "up" button and a "down" button for changing the BPM. Both tempo controls 328, 348 in FIG. 2 are set to a dance tempo of 120 BPM. Changing the tempo changes the amount of time over which loops, but not sounds, are ultimately rendered to the user.

The GUI 300 also includes a keyboard section 350 containing a set of interface elements in the shape of piano keyboard. The keyboard section 350 is associated with the fifth loop track 346 of the loop crafter section 308. The keyboard interface elements allow a user to vary the pitch of the sound assigned to the fifth loop track 346 in a known way in order to create a melody.

The GUI 300 also includes an effects section 360. The effects section 360 is associated with the fifth loop track 346 of the loop crafter section 308. The interface elements 362, 364 and 366 in the effects section 360 allow a user to select an effect, such as echo, filter, flanger, reverb and phaser, to be used to modify the audio segment assigned to the fifth loop track 346. The particular effect to be used may be selected from a drop down box 362 which also displays the currently selected effect ("echo" in FIG. 2). The effects section 360 also includes a delay control 364 controlling the delay after which the effect will take effect and a decay control 366 controlling the decay of the effect over time. Echo, filter, flanger, reverb and phaser effects are known in the art and need not be described here.

In addition to those effects known in the art, an embodiment of the present invention includes another effect, "reverse." In one embodiment, the reverse effect is not simply playing the audio data in reverse order or creating a "reversed" audio file by reversing the order of samples, as is known in the art. Because each audio segment will have a perceptible beat within its timeline (for example, a cymbal with a staccato crash followed by a trailing ring), that type of simple reverse often results in the location of the perceptible beat being reversed. In the cymbal example, the simple reverse results in a slow buildup to a crash. In an embodiment of the present invention, the reverse effect creates an audio segment that preserves the relative location of perceptible beat within the audio segment.

In the following section of the detailed description, methods according to varying embodiments of the invention are described. The description is made with reference to FIG. 3, which includes flowcharts of computer-implemented methods according to embodiments of the invention. Such computer-implemented methods are desirably realized at least in part as one or more programs running on a computer—that is, as a program executed from a computer-readable medium such as a memory or other storage device by a processor of a computer. The programs are desirably storable on a machine-readable medium such as a hard disk drive, CD-ROM, static or dynamic memory, optical or magnetic media, or other suitable storage media, for distribution and installation and execution on another computer.

Figure 3:
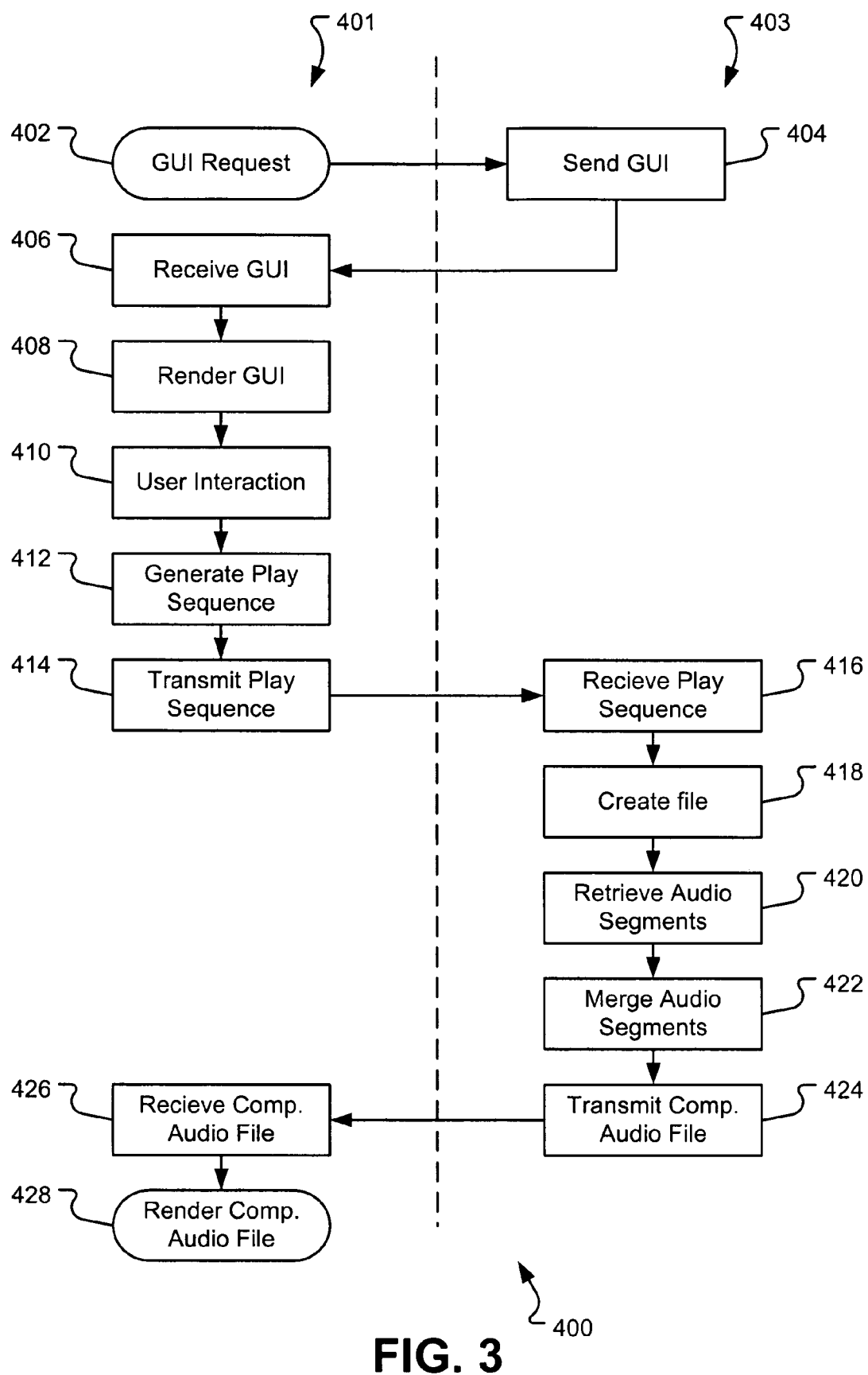
FIG. 3 is an illustration of an operational flow of logical operations performed by a client interface and a server application according to an embodiment of the present invention.

FIG. 3 is an illustration of an operational flow of logical operations of a method performed by a server application according to an embodiment of the present invention. The method 400 of FIG. 3 is divided into two sections, a first section 401 indicating the parts of the method of FIG. 3 that are performed by a client computer, and a second section 403 indicating the parts that are performed by a server computer. The two sections as shown in FIG. 3 are separated by a dotted line for added clarity.

The method 400 of FIG. 3 begins with the client computer sending a first request to the server computer in a GUI request operation 402. As discussed above, this may be an HTTP request to a domain name address.

The server responds to the request by generating and transmitting a response to the client computer containing the GUI in a send GUI operation 404. Send GUI operation 404 may require that a GUI be generated by an active server resource or may simply require the retrieval of the appropriate GUI file. Transmission of the GUI may require the creation of a response package, such as an HTTP response, to contain the GUI.

The client receives the GUI in a receive GUI operation 406 and renders the GUI to the user in render GUI operation 408. The render GUI operation 406 may include executing code transmitted by the server in the response or otherwise interpreting code such as markup language code to create the GUI.

After the GUI is rendered, in a user interaction operation 410 the user interacts with the GUI by selecting various loops and sounds, assigning such audio segments to tracks and dictating via the GUI when such audio segments are to be played relative to the timeline shown in the GUI. Upon completion of the interaction operation 410, the user presses the play button on the GUI thus indicating that the user desires to hear the play sequence corresponding to the visual representation displayed by the GUI.

A generate play sequence operation 412 is initiated when the user presses the play button. The generate play sequence operation 412 creates a play sequence corresponding to the current state of the GUI as displayed to the user. The play sequence identifies one or more audio segments and associates at least one location on the timeline within the play sequence with each audio segment. In one embodiment, the play sequence consists of, for each track with an assigned audio segment, an audio segment identifier, and the number of each phrase in the timeline for which the audio segment is to be played. The number of each phrase then identifies a temporal location, or point within the timeline, relative to the start of the audio. In an alternative embodiment, the track information is omitted and the play sequence consists only of a list of audio segment identifiers and, associated with each audio segment identifier, a corresponding list of phrase numbers.

The play sequence may contain other information as well. For example, the play sequence may include a volume indicator associated with each audio segment or track. The volume indicator identifying a volume relative to some base volume for the audio segment. The value of the volume indicator reflects the position of the volume control in the control subsection 316 for the associated track 310 when the play button was pressed by the user.

Similarly, in one embodiment a mute indicator may be provided indicated whether to mute the audio segment. Alternatively, if mute is selected for a given track the generate play sequence operation 412 may simply omit all information for the associated track from the play sequence or provide information indicating that no audio segment is selected for the associated track.

If the play sequence identifies a client audio segment that is not known to the server 210, such as a sound or loop stored on the client computer 202, the client audio segment may be retrieved by the browser 208 and included as part of the play sequence. In an alternative embodiment, the client audio segment may be transmitted with the play sequence rather than as part of the play sequence. In yet another alternative embodiment, such a client audio segment may be transmitted to the server upon selection by the user, assignment by the user to a track 310 or loop track 342 or when a user stores such client audio segments to the "My Loops" or "My Sounds" lists of the GUI. The client audio segment may also be added to the audio segment store for later use by the specific client or for general use by any future client.

The play sequence may also include a tempo. The tempo is then used by the server application 212 when retrieving the loops to define the time between predetermined temporal locations in the play sequence.

After the play sequence has been generated, it is transmitted to the server in a transmit play sequence operation 414. This may require the generation of an HTTP request directed to the server and containing the play sequence as a payload.

The play sequence is received by the server in a receive play sequence operation 416.

After receipt of the play sequence, the server then processes it to generate a composite audio file corresponding to the current state of the GUI as displayed to the user. In the embodiment shown in FIG. 3, processing includes creating an empty audio file in a create empty file operation 418. In an alternative embodiment, the create file operation 418 may be omitted by modifying the first retrieved audio segment as necessary to create to a final composite audio file.

Processing also may include retrieving each of the audio segments identified by the play sequence from an audio segment store in a retrieve audio segment operation 420. This may be performed by inspecting the play sequence and retrieving all the identified audio segments in a single operation or by retrieving each audio segment in an iterative fashion as they are required by the merge operation 424 (not shown).

Furthermore, the retrieving operation 420 may include regenerating the loops from a base set of sounds to conform to a user selected tempo provided by the play sequence. Such regeneration is not necessary in an embodiment in which the audio segment store includes a separate audio segment for each loop at each possible tempo selectable by the user from the GUI 300 or in those cases where a loop in the selected tempo happens to already be stored and available. However, if a specified loop at a user selected tempo has not been previously generated, then such a loop must be created before it can be merged with other loops and sounds. An embodiment in which the audio segment store includes a separate audio segment for each loop at each possible tempo selectable by the user from the GUI 300 is appropriate where storage space is freely available to the server as such an embodiment lowers the processing and memory load on the server in generating loops.

Each audio segment is then merged into a single composite audio file in a merge audio segments operation 422. The merge audio segments operation 422 requires that at least a portion of each retrieved audio segment be merged with the other identified audio segments to create the composite audio file. Merging of audio segments involves the summation of the audio data in each audio segment to approximate the waveform that would be created if the audio segments were independently and simultaneously rendered to a listener. Merging results in a single composite audio segment containing audio data approximating a composite audio waveform.

It is noted above that not necessarily all of a sound may be used to create the composite audio file. For example, if the audio segment is a loop and the loop is assigned to a phrase, then the entire audio segment will be merged into the composite audio file. However, in the case of a sound that may have a length greater than the temporal length of a phrase (when generating a composite audio file from the main mixer/sequencer of the GUI) or a section within a loop track (when generating a custom loop composite audio file from the loop crafter of the GUI) not all of the sound may be used and the sound truncated at the end of the phrase or section.

Finally, the composite audio file is transmitted to the client 202 by the server 210 in a transmit composite audio file operation 424. The composite audio file is received by the client 202 in a receive operation 426 and rendered to the user in a render operation 428. Render operation 428, in addition to rendering the composite audio file may further include visual effects. Visual effects such as a current location bar on the GUI 300 may be provided that moves from left to right over the timeline 314 in synchronization with the rendering of the composite audio file.

Alternative embodiments are also possible that add additional features or provide additional information to the user during the method 400. For example, in one embodiment as part of the receive play sequence operation 416, a confirmatory response is transmitted to the browser 208 indicating that the play sequence has been received and that processing is ongoing. This confirmatory response may include directions to the browser to cause the GUI 300 to display a "processing" symbol or some other indicator so that the user is aware that the system is functioning appropriately.

In another embodiment, the audio files transmitted to the client in transmit operation 424 are in an easily transportable format, such as the 64 kbps MP3 format, while the sound quality of the original audio segments stored on the server are of a higher quality, such as 44100 Hz 16-bit WAV files. When a user generates and plays a sound through the music creator, it is created on the server as a high quality file and then converted to lower quality for fast transmission. The keyboard, effects processor, and loop crafter all use the original WAV files as well, and send back a 64 kbps MP3 sound. By keeping high quality audio files on the server and using them as the source, the music creator provides the highest possible sound quality for sound generation. The final product may then be saved as a high quality file.

The method 400 is presented and described herein generally in terms of audio segments and composite audio files. The method 400 is both suitable for creating loops via the loop crafter section 308 and for creating composite audio files containing complex sounds such as songs via the main mixer/sequencer section 302.

It should be noted that the selection of specific loops and sounds, number of tracks and phrases displayed or utilized, and other details are illustrative only, and are not intended to limit the invention. It is within the scope of this invention to create an audio file from any number of loops and sounds using a client 202 with limited processing and hardware capabilities in communication with a server 210. For example by creating and saving a new loop, then assigning that loop to a track to combine it with additional sounds to create a more complex loop. It should be further noticed that while each of the illustrations above are presented in terms of a single client 202, it is squarely within the scope of this invention for the server application to concurrently support multiple clients at one time. In yet another aspect, the server 210 may consist of a server farm of multiple servers that divide up the processing load to accelerate generation the audio segments.

Figure 4:
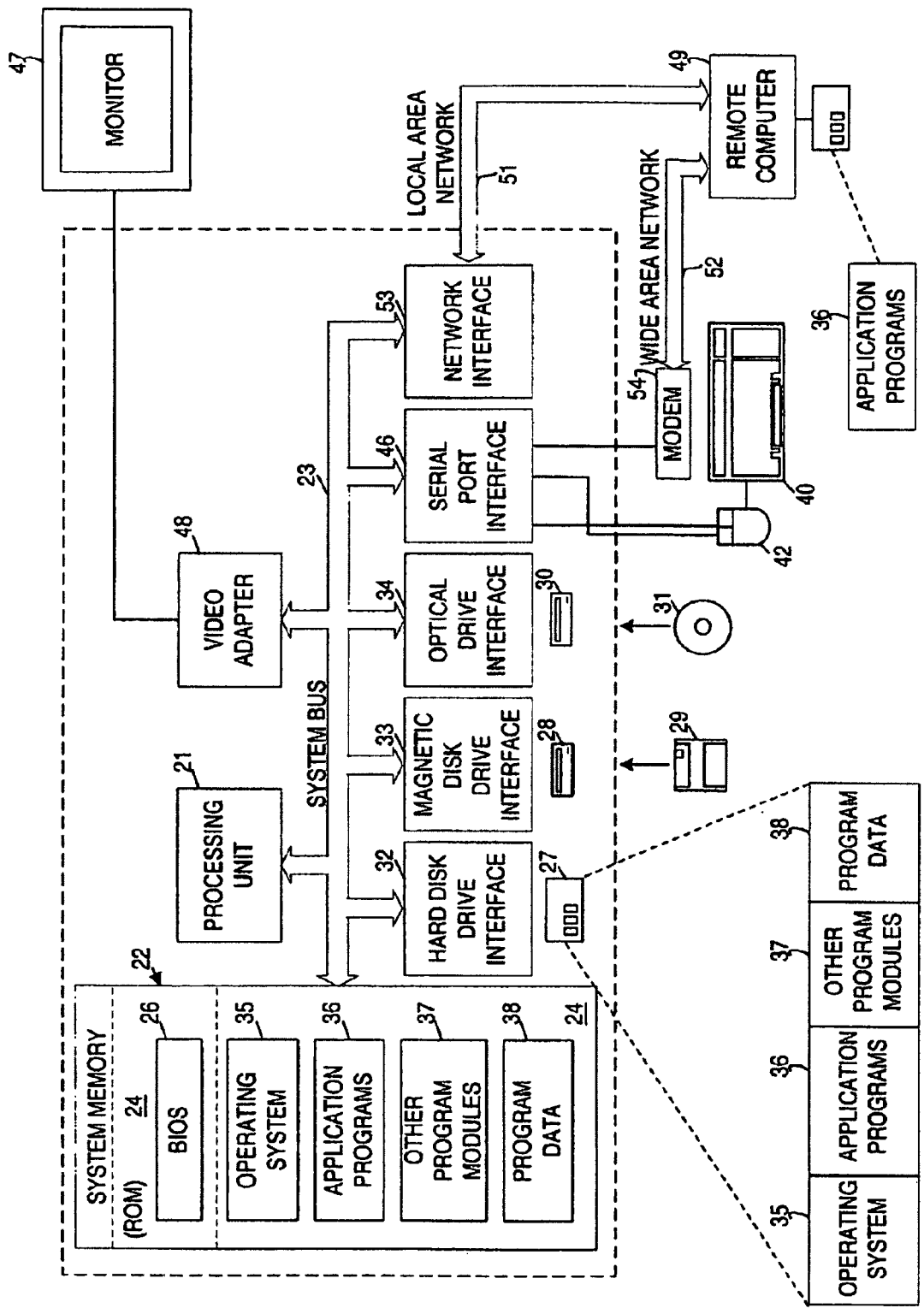
FIG. 4 is an illustration of a client-server computing environment in accordance with an embodiment of the present invention.

Referring now to FIG. 4, a diagram of a hardware and operating environment in conjunction with which embodiments of the invention may be practiced is shown. The description of FIG. 4 is intended to provide a brief, general description of suitable computer hardware and a suitable computing environment in conjunction with which embodiments of the invention may be implemented. Although not required, embodiments of the invention are described in the general context of computer-executable instructions, such as program modules, being executed by a computer, such as a personal computer or purpose built server computer. Generally, program modules include routines, programs, objects, components, data structures, etc., that perform particular tasks or implement particular abstract data types.

Moreover, those skilled in the art will appreciate that embodiments of the invention may be practiced with other computer system configurations, including hand-held devices, multiprocessor systems, microprocessor-based or programmable consumer electronics, network PC's, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices. Furthermore, embodiments of the invention may be practiced using server farms having multiple servers with the same resources that are "load balanced" to more efficiently respond to client requests.

With reference to FIG. 4, one example of a hardware and operating environment for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a purpose-built server computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM)

24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or apart of the computer 20; the invention is not limited to a particular type of communications device. The remote computer 49 may be another computer, a server, a network PC, a client, a Personal Digital Assistant (PDA), a peer device or other common network node, and typically includes many or all of the elements described above relative to the computer 20, although only a memory storage device 50 has been illustrated in FIG. 4. The logical connections depicted in FIG. 4 include a local-area network (LAN) 51 and a wide-area network (WAN) 52. Such networking environments are commonplace in office networks, enterprise-wide computer networks, intranets, home networks and the Internet, which are all examples of networks.

Depending on the type of network and the connection used, the computer 20 may be connected through a network interface or adapter 53, which is one type of communications device. The network interface may be, e.g., any wired or wireless interface which connects the computer 20 to a network. The computer 20 may communicate with the remote computer 49 through a wide area network, a local area network, or a combination thereof. The computer 20 may also include a modem 54, another type of communications device, or any other type of communications device for establishing communications over a network 52, such as the Internet. In FIG. 4, the modem 54, which may be internal or external, is connected to the system bus 23 via the serial port interface 46. It will be understood by those skilled in the art that the modem may be connected to the computer via a bus, any serial or parallel interface, the adapter 53, or otherwise. It will be further understood that the modem 54 may be any type of analog or digital modem, including without limitation a cable modem, a DSL modem, an analog modem, a wireless hub or router, or other Customer Premises Equipment (CPE). In a networked environment, program modules depicted relative to the personal computer 20, or portions thereof, may be stored in the remote memory storage device. It will be appreciated by those skilled in the art that the network connections shown are one example only and other means of and communications devices for establishing a communications link between the computers may be used.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A computer-readable medium encoding computer-executable instructions for performing a method for creating a composite audio file, the method comprising:
    receiving, from a remote client computer via a network connection, a play sequence for playing audio segments, the play sequence identifying one or more audio segments and associating at least one temporal location within a playback timeline with each audio segment;
    selecting at least one of the one or more audio segments;
    generating based on the selected at least one of the one or more audio segments and in response to a request from the remote client computer, a composite audio file including the selected at least one of the one or more audio segments, the composite audio file when played playing the selected at least one of the one or more audio segments identified by the play sequence at each audio segment's associated temporal location(s) within the playback timeline; and
    transmitting the composite audio file to the client computer via the network connection.

2. The computer-readable medium of claim 1, wherein the composite audio file is rendered prior to the transmitting step.

3. The computer-readable medium of claim 1, wherein the composite audio file is a compress audio file.

4. The computer-readable medium of claim 3, wherein the compressed audio file is a file compressed in accordance with an MPEG audio compression standard.

5. The computer-readable medium of claim 1, wherein generating further comprises:
    creating an empty audio file;
    retrieving each of the audio segments identified by the play sequence from an audio segment store;
    combining at least a portion of each retrieved audio segment and storing the resulting composite audio data into the empty audio file to create the composite audio file.

6. The computer-readable medium of claim 1, wherein the play sequence includes a direction to modify at least a selected one of the audio segments identified in the play sequence and the generating step further comprises:

modifying the selected one of the audio segments in accordance with the direction prior to storing the selected one of the audio segments into the empty audio file.

7. The computer-readable medium of claim 1, wherein receiving further comprises: receiving the play sequence as part of a communication from a browser on the client computer.

8. The computer-readable medium of claim 7, wherein receiving further comprises: receiving the play sequence as part of an HTTP request from the browser on the client computer.

9. The computer-readable medium of claim 7, wherein transmitting further comprises: transmitting the composite audio file to the browser on the client computer via the network connection.

10. The computer-readable medium of claim 9, wherein transmitting further comprises: transmitting the composite audio file to the browser on the client computer in association with an HTTP response to the browser.

11. The computer-readable medium of claim 1, wherein the method further comprises:
receiving, from the client computer, a tempo associated with the play sequence, the tempo defining the time between predetermined temporal locations in the playback timeline; and
modifying the retrieved audio segments as necessary to conform to the tempo.

12. The computer-readable medium of claim 11, wherein generating further comprises: generating the composite audio file such that the time between temporal locations conforms to the tempo.

13. The computer-readable medium of claim 1, wherein the play sequence identifies at least one client audio segment that is not contained within the audio segment store and receiving further comprises:
receiving the client audio segment with the play sequence; and
storing the client audio segment to the audio segment store.

14. A computer-readable medium encoding computer-executable instructions for performing a method for creating a composite audio file, the method comprising;
receiving, from a remote client computer via a network connection, a play sequence for playing audio segments, the play sequence including one or more track sequences, each track sequence identifying one audio segment and at least one temporal location within a playback timeline;
selecting at least one of the one or more track sequences;
generating, based on the selected at least one of the one or more track sequences and in response to a request from the remote client computer, a composite audio file including audio segments identified in the play sequence, the composite audio file when played playing each audio segment identified by the one or more track sequences in the play sequence at each audio segment's associated temporal location(s) within the playback timeline; and
transmitting the composite audio file to the client computer via the network connection.

15. The computer-readable medium of claim 14, wherein generating includes: for each track sequence,
creating an empty audio track;
retrieving the audio segment identified by the track sequence from a audio segment store;
storing at least a portion of the retrieved audio segment into the empty audio track to create a audio track associated with the track sequence; and
merging the audio tracks to create the audio file.

16. The computer-readable medium of claim 14, wherein the play sequence includes a relative volume indicator associated with a first track sequence, the relative volume indicator defining the volume of the track's identified audio segment relative to a reference volume and merging includes:
adjusting the volume of the first track relative to the audio file.

17. The computer-readable medium of claim 14, wherein the play sequence includes an effect indicator associated with the first track sequence, the effect indicator defining a modification to be performed on the track's identified audio segment and merging includes:
modifying the audio segment identified by the track sequence after its retrieval from the audio segment store based on the effect indicator.

18. The computer-readable medium of claim 17, wherein the effect indicator associated with the first track sequence defines a modification selected from the group consisting of an echo effect, a flanger effect, a reverse effect, a phaser effect, and a filter effect.

19. The computer-readable medium of claim 17, wherein the effect indicator associated with the first track sequence includes an associated delay indicator and an associated decay indicator.

20. The computer-readable medium of claim 14, wherein receiving includes: receiving the play sequence as part of a communication from a browser on the client computer.

21. The computer-readable medium of claim 20, wherein receiving includes: receiving the play sequence as part of an HTTP request from the browser on the client computer.

22. The computer-readable medium of claim 14, wherein the method includes:
receiving, from the client computer, a tempo associated with the play sequence, the tempo defining the time between predetermined temporal locations in the play sequence; and
modifying the retrieved audio segments as necessary to conform to the tempo.

23. The computer-readable medium of claim 22, wherein generating includes: generating the composite audio file such that the time between all temporal locations conforms to the tempo.

24. The computer-readable medium of claim 14, wherein each audio segment is selected from the group consisting of a sound loop, a sound recording, a music recording, a voice recording, a generated tone, a generated sound, and a previously generated composite audio file.

25. The computer-readable medium of claim 14, wherein the play sequence includes at least one track sequence identifying a client audio segment that is not contained within the audio segment store and receiving includes:
receiving the client audio segment with the play sequence; and
storing the client audio segment to the audio segment store.

26. A system for creating composite audio files, comprising:
a server computer coupled to a communications network and operable to communicate via the communications network with a remote client computer coupled to the communications network, the server computer having a processor and memory containing computer-executable instructions, the instructions causing the server computer to perform, responsive to receiving a first client request from the remote client computer via the communications network, a method including:
transmitting to the client computer computer-executable instructions for generating and displaying a graphical user interface on a display device of the remote client computer, the graphical user interface providing for selection of audio segments accessible to the server computer but not directly resident on the remote client computer, arrangement of the audio segments into a play sequence by identifying temporal locations within the play sequence at which the selected audio segments should be played; and generation of the play sequence as a composite audio file.

27. The system for creating composite audio files of claim 26, wherein the play sequence composite audio file is transmitted to the server computer in response to a request to render the play sequence, the user request being initiated on the remote client computer.

28. The system for creating composite audio files of claim 26, wherein the memory contains computer-executable instructions, said instructions causing the computing device to perform, responsive to receiving, from the remote client computer via a network connection, the play sequence for playing audio segments, the play sequence including one or more track sequences, each track sequence identifying one audio segment and at least one temporal location within the track sequence, the following method including:
  storing the play sequence, at least temporarily;
  generating based on the play sequence a composite audio file including each audio segment identified in the play sequence, the composite audio file when played playing each audio segment identified by the one or more track sequences in the play sequence at each audio segment's associated temporal location(s); and
  transmitting the composite audio file to the remote client computer via the communication network.

29. The system for creating composite audio files of claim 26, further comprising:
  an audio segment store in communication with the server computer and storing a plurality of audio segments,
  wherein the graphical user interface transmitted to the client can display a listing of at least some of the audio segments in the audio segment store from which a user may select audio segments in the audio segment store.

30. The system for creating composite audio files of claim 26, wherein the graphical user interface allows the user to select a client audio segment from audio segments directly accessible to the remote client computer, to arrange the client audio segment in the play sequence and, responsive to a user request to render the play sequence, transmits the client audio segment to the server computer.

31. The system for creating composite audio files of claim 26, further comprising:
  the memory containing computer-executable instructions, said instructions causing said computing device to perform, responsive to receiving, from the remote client computer one or more client audio segments, the following method including:
    storing the client audio segments; and
    generating the composite audio file using the client audio segments as directed by the play sequence.

32. A computer-readable medium encoding computer-executable instructions for performing a method for creating a composite audio file, the method comprising:
  receiving, from a remote client computer via a network connection, a play sequence for playing audio segments, the play sequence identifying one or more audio segments and associating at least one temporal location within a playback timeline with each audio segment;
  identifying, based on the play sequence, temporal locations within the playback timeline that are not associated with an audio segment;
  generating audio data for each temporal location identified in the play sequence, wherein for each temporal location associated with an audio segment generating audio data for the temporal location from the associated audio segment and for each temporal location not associated with an audio segment generating audio data indicative of silence;
  selecting at least one of the generated audio data for a respective temporal location; and
  assembling the selected at least one of the generated audio data into a composite audio file.

33. The computer-readable medium of claim 32, wherein assembling includes:
  creating a first audio file containing audio data indicative of silence; and
  for each temporal location associated with an audio segment, overwriting the audio data indicative of silence with the audio data generated from the associated audio segment whereby the first audio file becomes the composite audio file.

34. The computer-readable medium of claim 32, wherein assembling includes:
  creating an audio file containing, at each temporal location associated with an audio segment, the audio data generated from the associated audio segment; and
  inserting into the audio file audio data indicative of silence at each temporal location not associated with an audio segment.

35. The computer-readable medium of claim 32, wherein assembling includes:
  creating a first audio file containing audio data indicative of silence; and
  for each temporal location associated with an audio segment, summing the audio data in the first audio file with the audio data generated from the associated audio segment such that the first audio file becomes the composite audio file.

36. The computer-readable medium of claim 32, wherein generating includes:
  retrieving each of the audio segments identified by the play sequence from an audio segment store; and
  generating the audio data for the temporal location from the associated audio segment based on a tempo identified by the play sequence.

* * * * *